(No Model.)
W. A. WRIGHT.
BICYCLE.
No. 489,112. Patented Jan. 3, 1893.
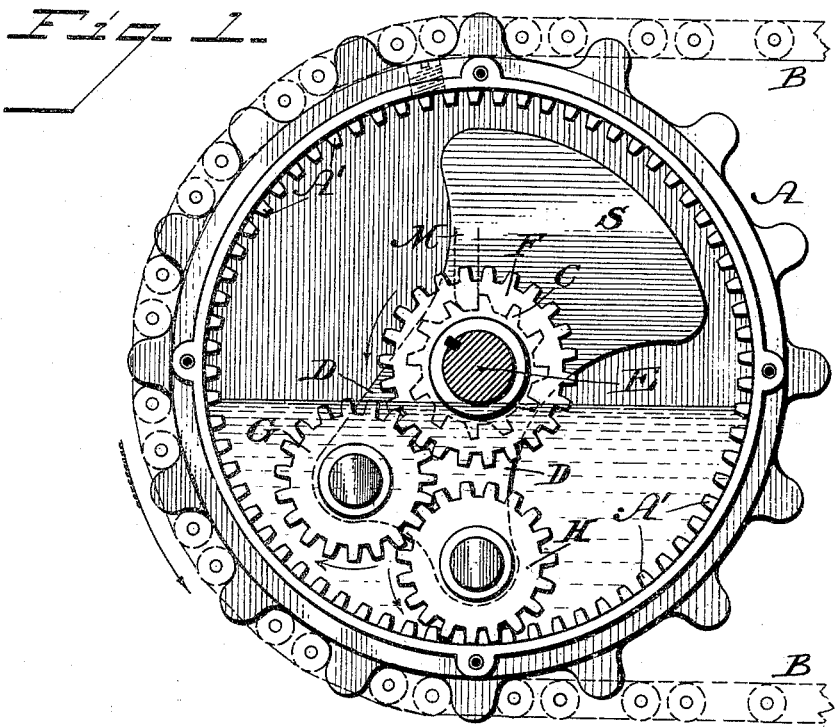
Fig. 1.
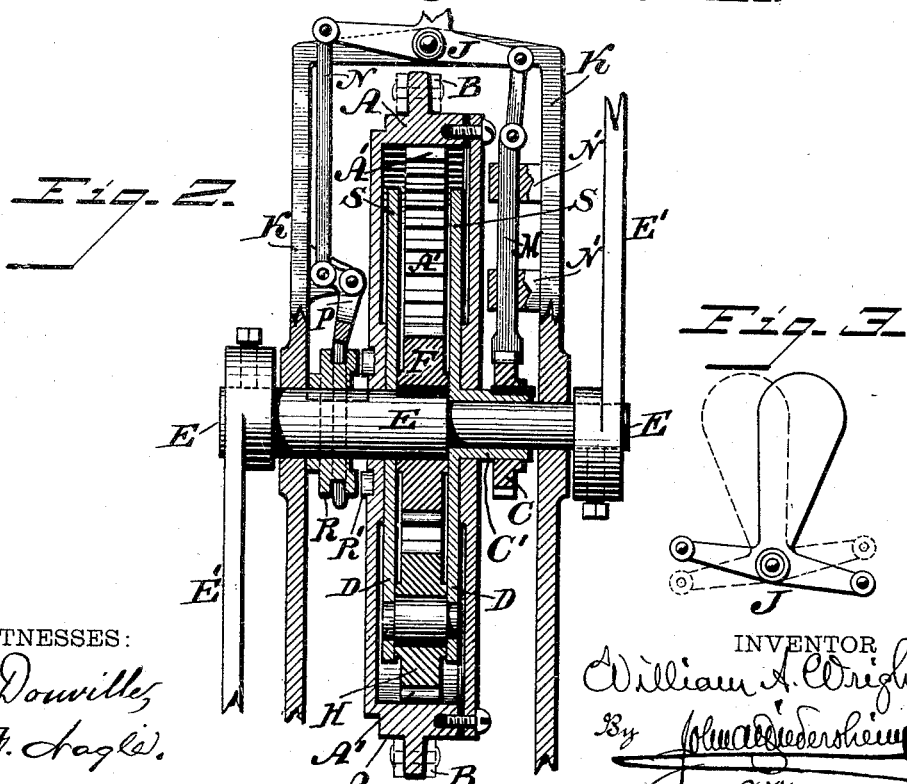
Fig. 2.
Fig. 3.
WITNESSES:
L. Douville
P. F. Eagle
INVENTOR
William A. Wright.
By John A. Wiedersheim
Attorney.
THE NORRIS PETERS CO., PHOTO-LITHO., WASHINGTON, D. C.

UNITED STATES PATENT OFFICE.

WILLIAM A. WRIGHT, OF CENTRETON, NEW JERSEY, ASSIGNOR OF ONE-HALF TO BROWN & GILMAN, OF PHILADELPHIA, PENNSYLVANIA.

BICYCLE.

SPECIFICATION forming part of Letters Patent No. 489,112, dated January 3, 1893.

Application filed February 27, 1892. Serial No. 423,018. (No model.)

*To all whom it may concern:*

Be it known that I, WILLIAM A. WRIGHT, a citizen of the United States, residing at Centreton, in the county of Burlington, State of New Jersey, have invented a new and useful Improvement in Bicycles, &c., which improvement is fully set forth in the following specification and accompanying drawings.

My invention consists of a bicycle or other vehicle of the order of a velocipede, constructed to have power imparted to the same when it is desired to ascend steep grades, hills, &c., or to be driven with speed when on flat ground. For this purpose I employ mechanism which adapts the sprocket or driving wheel of the bicycle to be rotated directly at the axle, or at the periphery thereof, as will be hereinafter fully set forth.

Figure 1 represents a section of a portion of a bicycle embodying my invention. Fig. 2 represents a partial end view and partial vertical section at a right angle to Fig. 1. Fig. 3 represents views of a detail portion of the device in different positions.

Similar letters of reference indicate corresponding parts in the two figures.

Referring to the drawings: A designates the sprocket wheel of a bicycle, and B designates the chain by which the bicycle is propelled therefrom, said sprocket wheel being hollow.

C designates a ratchet or toothed wheel which is keyed or otherwise secured to the hub C' of a frame D, said hub and the opposite side of the frame D being freely mounted on the axle E to which the crank or pedal arms E' are attached.

F designates a pinion which is secured to the axle E, within the frame D, it being noticed that said frame is within the sprocket wheel A, and that said wheel A is freely mounted partly on the hub C' and partly on the axle E. The frame D carries the idler G and pinion H, said idler meshing with both the pinions F and H, whereby said pinions rotate in the same direction. The sprocket wheel A has an internal gear A' with which the pinion H meshes.

J designates a lever which is mounted on the frame K of the bicycle, and has pivoted to its ends respectively, the dog or pawl M and rod N, said pawl being fitted in guides N' on the frame K, and being adapted to engage with the toothed wheel C. The rod N is pivoted to an elbow lever P, whose bearings are on the frame K, and has its lower end engaged with one member R of a clutch, which member is adapted to engage with a clutch member R' on the side of the sprocket wheel.

The operation is as follows: When the bicycle is to ascend a hill or steep grade, as increased power is desired, the lever J is thrown in the present case to the right, whereby the pawl M engages the toothed wheel C and controls the frame D, so as to prevent rotation thereof. The axle communicates motion to the pinion F, and consequently to the pinion H, which engaging with the gear A' of the sprocket wheel communicates power to said wheel at the periphery thereof, and causes the powerful propulsion of the bicycle. Should speed be required, the lever J is thrown to the left, whereby the clutch is operated, thereby locking the sprocket wheel with the axle E, so that motion is imparted to said wheel directly from the axle, the dog M being of course disengaged from the wheel C.

The frame D is provided with a weight S opposite to the location of the idler G and pinion H to counterbalance the latter, as is evident.

As the driving wheel is hollow, it forms a chamber for containing oil, so as to lubricate the gearing and parts within the same, the interior of the wheel being also guarded against the entrance of dust or dirt, as is evident. A suitable opening may be formed in the wall of the wheel to admit oil, the same being afterward closed by a cap, plug or screw as desired.

Having thus described my invention, what I claim as new, and desire to secure by Letters Patent, is—

1. A hollow sprocket wheel having internal gear, a frame mounted on the axle of said sprocket wheel and having a hub on which one portion of said wheel is mounted, gearing connecting said axle and wheel, a clutch and a pinion on said axle, a pivoted lever having a pawl at one end adapted to engage said pinion, and a lever connected with the other end for operating said clutch, said parts being combined substantially as described.

2. An axle, a hollow sprocket wheel mounted thereon, and having internal gearing, a frame within said wheel on said axle, and having a hub on which one portion of said wheel is mounted, a pinion on said hub, a train of gearing connecting said axle and said sprocket wheel, a bicycle frame, a lever pivoted thereon, a pawl connected with one end of said lever and guided in ways on said frame, for engaging said pinion, a fast clutch member on said axle, and an elbow lever connected by a rod to said pivoted lever for operating said clutch member, said parts being combined substantially as described.

3. A bicycle having a hollow driving wheel, a pinion on the shaft thereof, and gearing meshing with the pinion and wheel, a toothed wheel on the bearing-frame of said gearing, and a clutch on the axle and driving wheel, in combination with a lever, and a dog and elbow lever connected with the ends thereof said dog being adapted to engage with the toothed wheel of the aforesaid bearing-frame, and said lever engaging with the movable member of said clutch, substantially as described.

WILLIAM A. WRIGHT.

Witnesses:
JOHN A. WIEDERSHEIM,
A. P. JENNINGS.